June 5, 1956  E. H. KIRBY  2,748,684
SWEEP ATTACHMENT FOR A CULTIVATOR
Filed April 30, 1954
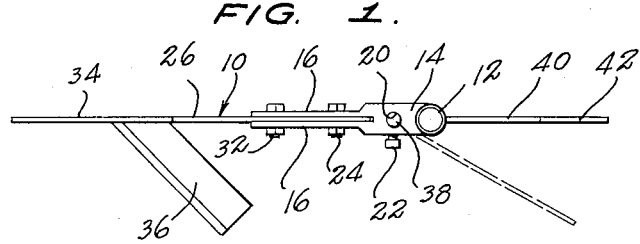
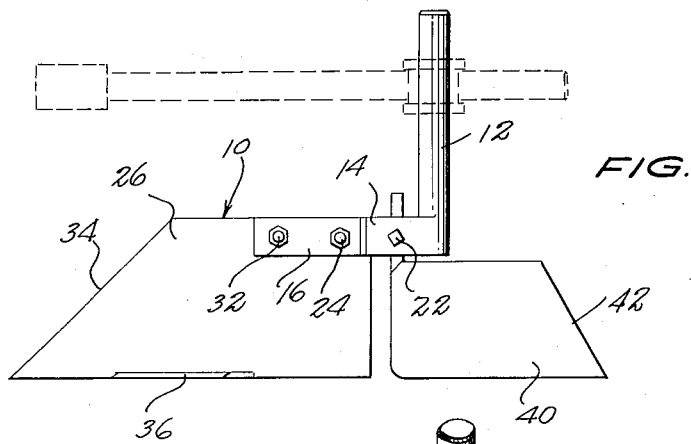
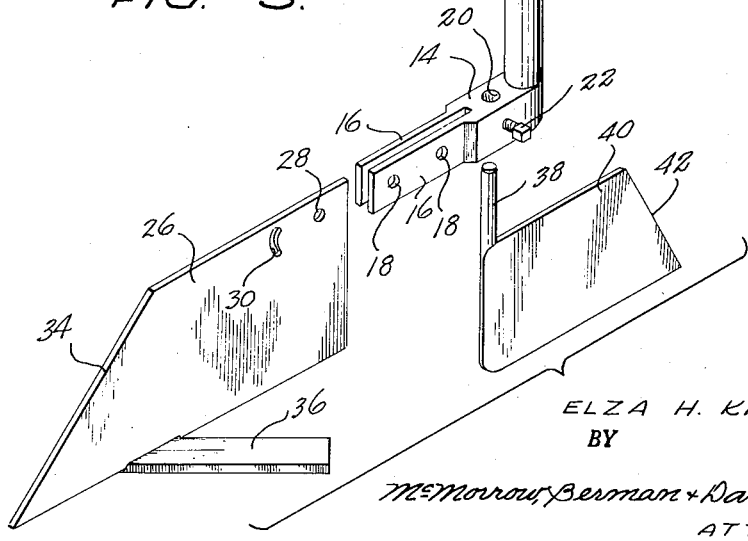
INVENTOR.
ELZA H. KIRBY,
BY
McMorrow, Berman + Davidson
ATTORNEYS.

United States Patent Office 2,748,684
Patented June 5, 1956

2,748,684

SWEEP ATTACHMENT FOR A CULTIVATOR

Elza H. Kirby, Mount Pulaski, Ill.

Application April 30, 1954, Serial No. 426,718

2 Claims. (Cl. 97—205)

This invention relates to a sweep attachment for a cultivator and has for its primary object to throw the soil in a selected direction to cover the roots of plants and the like.

Another object is to enable the amount of soil being handled by the cultivator to be regulated according to the desires of the user.

The above and other objects may be attained by employing this invention which embodies among its features a post adapted to be attached to and to extend downwardly from a cultivator beam, a main blade carried by the post and extending downwardly therefrom, a side blade carried by the main blade and extending diagonally outwardly therefrom intermediate the ends thereof, and a tail wing carried by the post for movement to a selected position about an axis which lies parallel to the post immediately behind the main blade.

Other features include ears carried by the post and connected to the main blade for tiltingly supporting said blade on said post, a spindle carried by the post for movement about an axis which lies parallel to the post, and a tail wing carried by the spindle for movement therewith in a horizontal arcuate path to a selected position behind the main blade.

In the drawings:

Figure 1 is a top plan view of a sweep attachment embodying the features of this invention;

Figure 2 is a side view of the sweep attachment illustrated in Figure 1; and

Figure 3 is an exploded perspective view of the sweep attachment.

Referring to the drawings in detail, the sweep attachment designated generally 10 comprises a post 12 which is adapted to be mounted on a cultivator beam, as suggested in the dotted lines in Figure 2. As illustrated, the post 12 extends substantially vertically downwardly from the beam and carries at its lower end a substantially horizontally extending socket member 14 which in turn has projecting longitudinally therefrom adjacent the ends thereof remote from the post a pair of spaced ears 16 having aligned bolt holes 18 extending therethrough. The socket member and ears together constitute a horizontal arm projecting forwardly from the post. The socket member 14 is provided with an opening 20 which extends therethrough in parallel relation to the post 12 and threadedly engaged with the socket member 14 and extending into the opening 20 is a set screw 22, the purpose of which will hereinafter appear.

Mounted for rocking movement on a pivot bolt 24 which extends through the opening 18 adjacent the post 12 is a main blade 26 having an opening 28 extending therethrough for the reception of the bolt 24, and extending through the blade 26 in spaced relation to the opening 28 is an arcuate slot 30 which lies concentric about the axis of the opening 28 and receives an adjusting bolt 32 which extends through the openings 18 remote from the post 12. The end of the main blade 26 remote from the post 12 inclines upwardly as at 34 and carried by the main blade intermediate the ends thereof and extending diagonally laterally therefrom is a side blade 36 which inclines outwardly as it approaches the rear end of the device.

Mounted for rotation in the opening 20 in the socket 14 is a spindle 38 carrying a tail wing 40, the rear end of which slopes downwardly and outwardly as at 42. With the spindle 38 entering the opening 20 in the socket 14, the tail wing 40 may be rotated about an axis which lies parallel to the post 12 and in a substantially horizontal arcuate path immediately behind the main blade 26, as will be readily understood upon reference to Figure 2. The position of the tail wing 40 may be selected and upon tightening the set screw 22 on the spindle 38, it will be evident that the tail wing will be held in a selected position, as suggested by the dotted lines in Figure 1.

In use, it will be evident that with the post 12 coupled to the cultivator beam substantially as illustrated in the broken lines in Figure 2, the height of the sweep 10 may be regulated by adjusting the post 12 relative to the cultivator beam so as to enable the blade 26 to advance at a selected depth to the ground to be cultivated. Obviously, the angle at which the point of the blade 26 enters the ground, and the tilt of the side blade 36 may be regulated by adjusting the position of the blade 26 around the axis of the opening 28 therein and the selected position of the blade 26 will be held by the bolt 32. With the blade 26 adjusted to the selected tilt, the volume of earth to be directed onto the plants being cultivated may be regulated by rotating the spindle 38 within the opening 20 of the socket 14 so that the wing 40 will extend at a desired angle relative to the blade 26, after which the tightening of the set screw 22 will retain the wing 40 in the selected position.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. A sweep attachment for a cultivator beam comprising: a post adapted to depend from and be secured to said beam; an arm projecting forwardly from the post; a main blade lying in a vertical plane and pivotally connected to the front end of the arm for swingable adjustment about a horizontal axis to selected positions in said plane; a substantially flat side wing rigid with and projecting laterally from the main blade in a plane substantially normal to that of the main blade at a location spaced from the pivot axis of the main blade, thus to be tilted transversely into a selected inclined plane on swingable adjustment of the main blade; and a tail wing lying in a vertical plane and pivotally connected to said arm for swinging adjustment about a vertical axis rearwardly of the main blade, whereby to be adjusted into a selected angular relationship to the planes of each of the main blade and side wing.

2. A sweep attachment for a cultivator beam comprising: a post adapted to depend from and be secured to said beam, an arm projecting forwardly from the post, said arm including at its front end a pair of flat ears lying in vertical planes and spaced apart to define therebetween a socket; a main blade lying in a vertical plane and pivotally mounted in said socket to swing about a horizontal axis, for swinging adjustment of the main blade about said axis to selected positions in its plane; a substantially flat side wing rigid with and projecting laterally from the main blade in a plane substantially normal to that of the main blade, at a location spaced from the pivot axis of the main blade, thus to be tilted transversely into a selected inclined plane on said swinging adjustment of the main blade, the arm having a vertical bore rearwardly of the main blade; a spindle rotatably adjustable in said bore; and a tail wing lying in a vertical plane, said tail wing being rigid with the spindle and extending radially of the axis of rotation of the spindle rearwardly from the main blade, so as to be rotatably adjusted with the spindle about the spindle axis into a selected angular relationship to the planes of each of the main blade and side wing.

References Cited in the file of this patent

UNITED STATES PATENTS

| | | |
|---|---|---|
| 768,029 | Burdick | Aug. 23, 1904 |
| 983,493 | Hendren | Feb. 7, 1911 |
| 1,633,232 | Sievers | June 21, 1927 |
| 1,799,519 | Laube | Apr. 7, 1931 |
| 1,847,490 | Mayfield | Mar. 1, 1932 |